Nov. 13, 1951     H. C. PIERCE     2,574,657
FLEXIBLE POWER TRANSMITTING MECHANISM
Filed Oct. 23, 1945     3 Sheets-Sheet 1
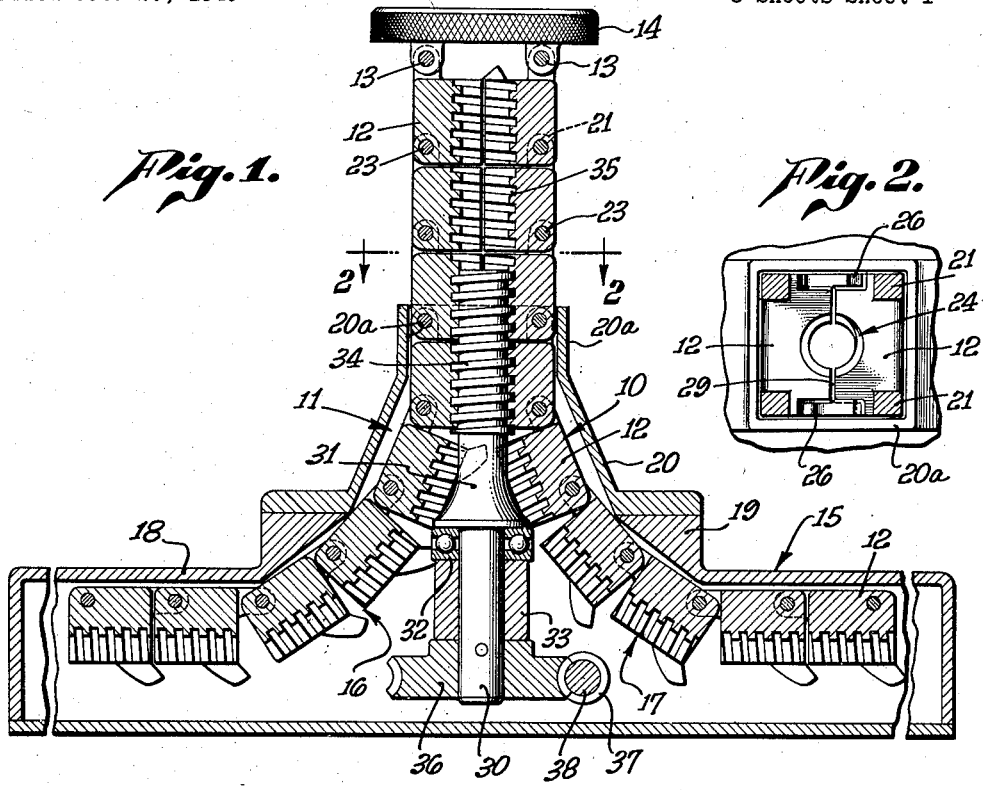
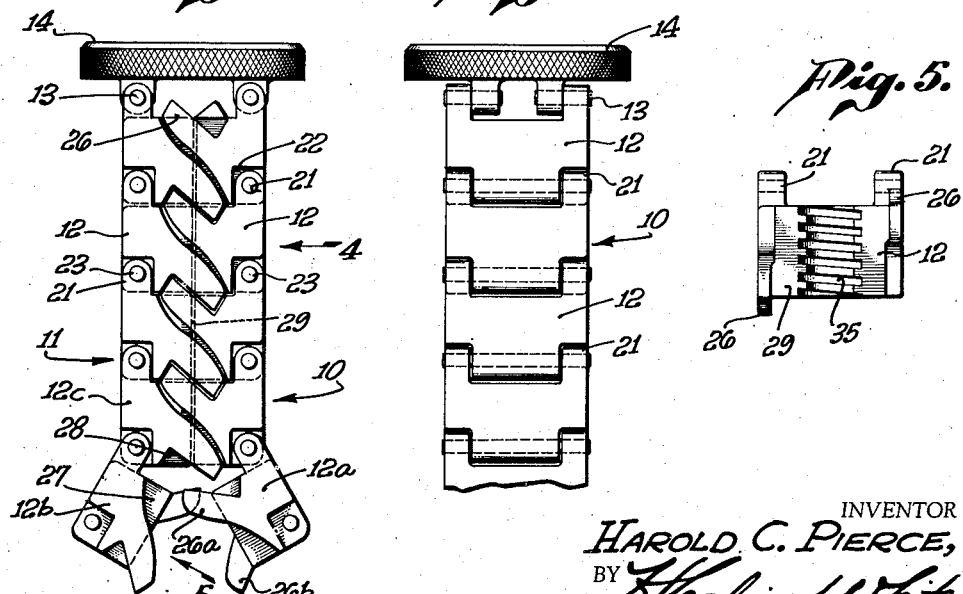
INVENTOR
HAROLD C. PIERCE,
BY
ATTORNEY

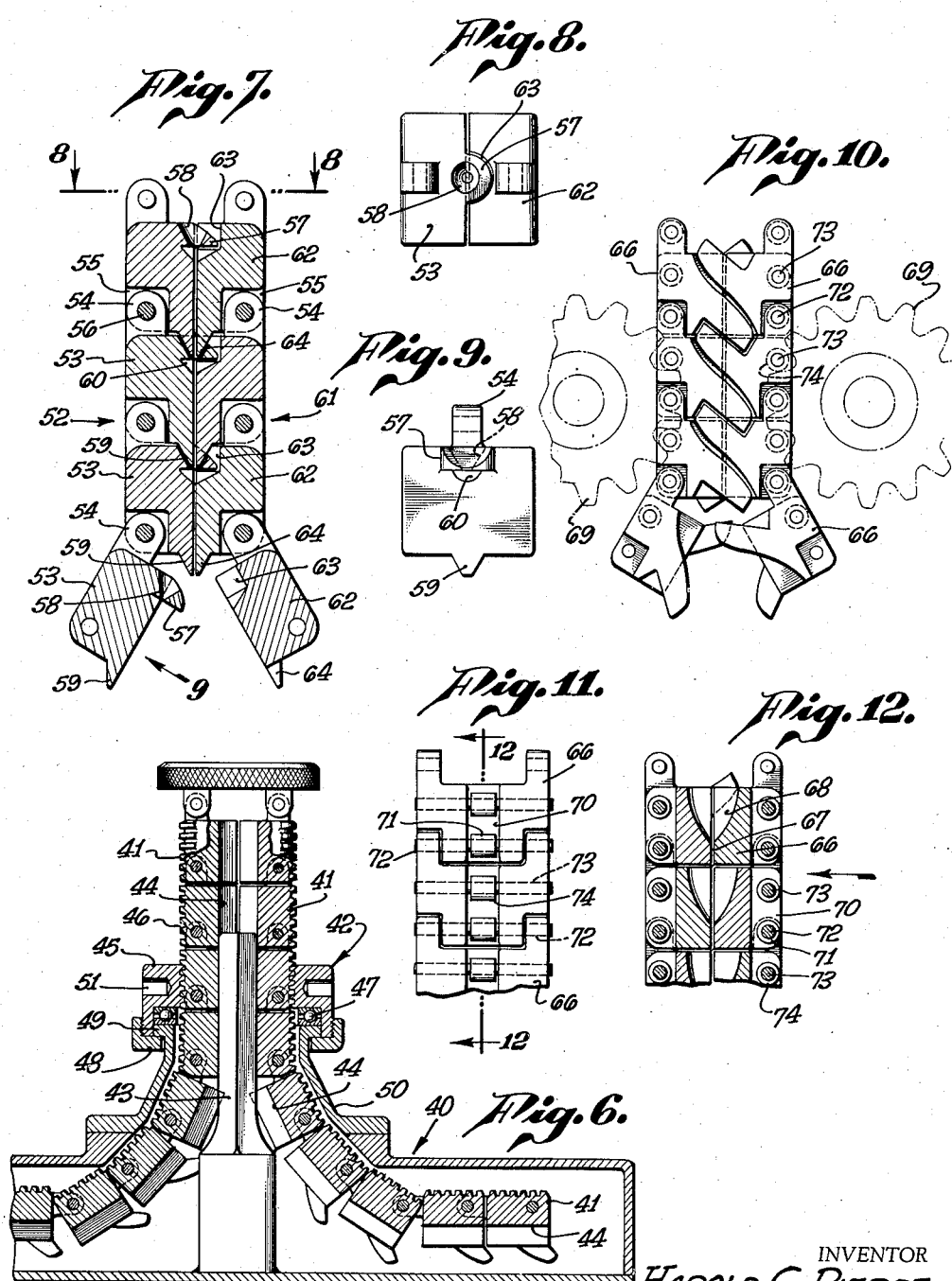

Nov. 13, 1951      H. C. PIERCE      2,574,657
FLEXIBLE POWER TRANSMITTING MECHANISM
Filed Oct. 23, 1945      3 Sheets-Sheet 3
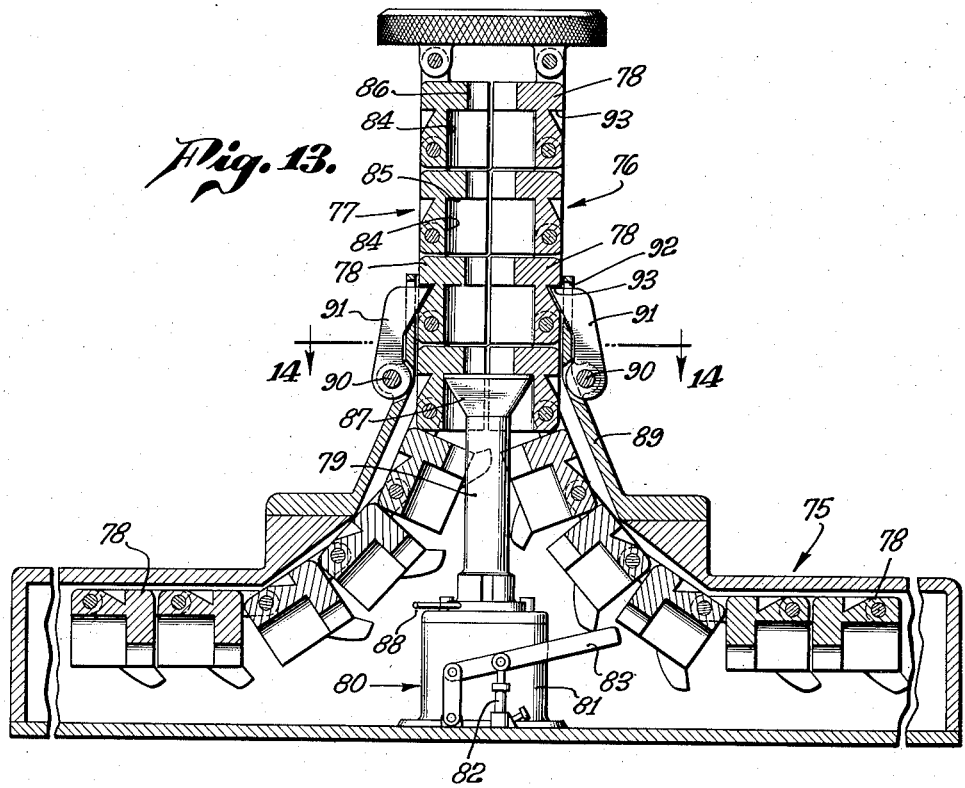
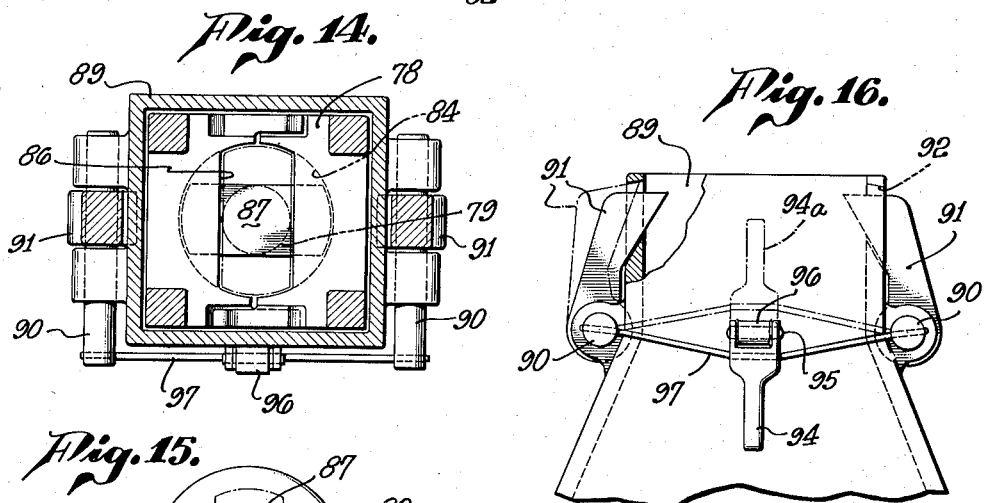
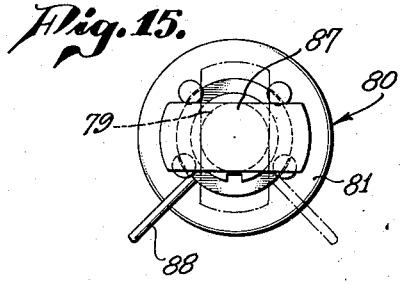
INVENTOR
HAROLD C. PIERCE,
BY
ATTORNEY Patented Nov. 13, 1951

2,574,657

UNITED STATES PATENT OFFICE 2,574,657

FLEXIBLE POWER TRANSMITTING MECHANISM

Harold C. Pierce, Pomona, Calif.

Application October 23, 1945, Serial No. 624,009

20 Claims. (Cl. 254—1)

This invention has to do generally with improved mechanisms adaptable to serve a wide variety of purposes such as the transmission of power or forces that may be of great magnitude, and for the support of stationary or movable loads, the present mechanism being characterized because of its unique construction and operation, and by its further adaptability to services which conventional mechanisms are not adaptable because of their structural or functional limitations.

More particularly, the invention relates to mechanisms of the type indicated, comprising a pair of normally flexible members, preferably in the form of chains composed of pivotally connected rigid segments or links, and capable of interlocking association such that by bringing together in parallel relation the individual chains from a condition of flexibility, they automatically interlock to form in effect a rigid member, the length of which may be extended indefinitely within the limit of the common length of the chains.

One major object of the invention is to so construct the chains as to enable them, in interlocked condition, to be capable of sustaining loads or transmitting forces of great magnitude. In furtherance of this object, the chain lengths preferably are made of solid form to have great compressive strength, and so associated that forces are transmitted directly through the bodies of the links, independently of their pivotal connections. Also it is found most advantageous to employ in each chain a single series of directly interconnected links of substantially identical form, thus obviating the necessity for different segment patterns in either or both of the chains.

A further feature of importance is the provision, preferably in conjunction with each link, of means whereby the two chain links as they are brought together, interlock in a manner preventing substantial relative lateral movement of the interlocked links in any direction, thus assuring substantially complete rigidity of the interengaged chains under the influence of whatever forces that may be applied to them.

The invention broadly contemplates any suitable means for actuating the chains, individually or together, to bring them convergently into and out of interlocked relation. As will appear, the actuating forces may be applied interiorly or exteriorly of the paired chains, and may be of various specific types employing for example sprockets, gears or fluid pressure actuated means as the prime movers.

A further and specific object is to provide an improved lifting jack employing the described mechanism and characterized by the following advantages: By reason of the flexibility and lateral distensibility of the interlocking chain parts, when separated, the jack head may be brought down beneath low ground clearances. Due however to the interlocking characteristic of the chains, the only limitation upon the height to which the jack may be elevated is the chain lengths selected for use in any particular jack.

Further features and objects of the invention, as well as the details of typical and preferred embodiments thereof, will be understood from the detailed description to follow, throughout which reference is made to the accompanying drawings, and in which:

Fig. 1 is a sectional view illustrating one form of the invention as embodied in a jack or lift mechanism;

Fig. 2 is a cross-section on line 2—2 of Fig. 1;

Fig. 3 is a fragmentary side elevation of the interlocked portions of the flexible members;

Fig. 4 is a side view of Fig. 3;

Fig. 5 is an inside view of one of the links;

Fig. 6 is a view similar to Fig. 1 showing a variational form of the invention;

Fig. 7 is a fragmentary section illustrating a further variational embodiment;

Fig. 8 is a plan view taken on line 8—8 of Fig. 7;

Fig. 9 is an inside view of one of the links in Fig. 7;

Fig. 10 is a side elevation showing another variant form of the invention;

Fig. 11 is a fragmentary side view of Fig. 10;

Fig. 12 is a section on line 12—12 of Fig. 11;

Fig. 13 is a view similar to Fig. 1 illustrating a variational form of the invention;

Fig. 14 is a cross-section taken through the interlocked chains on line 14—14 of Fig. 13;

Fig. 15 is a plan view of the piston and cylinder assembly appearing in Fig. 13; and Fig. 16 is a fragmentary side elevation of the top guide portion of the base, and illustrating particularly the latch control.

As previously indicated, the invention broadly contemplates the use of any of the hereinafter described forms of interlocking normally flexible members, and their actuating mechanisms, for any specific purpose to which they may be adapted, ordinarily for force transmission and most usually, though not always necessarily, by compression forces transmitted through the interlocked members. Merely as illustrative of a typical adaptation, the invention is shown in Fig. 1 to be embodied in a jack or lift mechanism, useable for example as an automobile jack.

The mechanism comprises what may be considered broadly as normally flexible members, generally indicated at 10 and 11, each comprising a continuous series of rigid segments or links 12 interconnected for relative pivotal movement. The members may be suitably connected at their upper ends, as by pivots 13, to a work support or head 14, and the lower extents of the members are received within a suitable base structure 15 proportioned to accommodate the divergent portions 16 and 17 of the members, as well as their outer free ends to the extent that these ends are displaced into the base as the work support 14 is lowered. The base 15 may be of any suitable form, and is shown typically to comprise a hollow body 18 having an upper convergent portion 19 and a further converging guide head 20, the top portion 20a of which may be slightly larger than the interlocked members 10 and 11 and of cross-sectional shape corresponding to the cross-sectional shape of the members in interlocked condition.

Each of the members 10 and 11 preferably consists of solid body links 12 of substantially identical form, each link having a pair of integral lugs 21 received within recesses 22 in the opposite sides of an adjacent link, and pivotally connected thereto by pins 23. The transverse proportions of each link preferably are such that when interlocked, the two chains form solid segments of such mass and strength as to be capable of transmitting extremely high compressive forces without failure. Thus as shown in Fig. 2, the interlocked links may form substantially square cross-sectional segments of solid metal except at the central propulsion screw openings 24. The links and their pivotal connection may be so designed that when interlocked in straight alinement, successive links will be in end-to-end engagement, compressive forces thus being transmitted through the bodies of the links without imposing shearing stresses on the pins 23. As illustrative, this condition may exist by allowing sufficient looseness in the pivotal connections to permit end-to-end engagement of successive links.

Referring to Fig. 3, each link 12 has on its opposite sides a projection 26 extending longitudinally of the interlocked members in overlapping relation with two adjacent links of the companion member 10 or 11. Thus link 12a has on one of its sides a projection 26a receivable within a recess 27 in the opposite link 12b and also within a recess 28 in the link 12c. The oppositely extending projection 26b on the other side of the link 12a similarly is receivable within recesses corresponding to 27a and 12c in the reverse sides of links 12b and 12c. Upon vertical advancement of the members 10 and 11, the links 12 swing into interlocked relation whereby the overlap of each projection 26 with two links opposite the link carrying the projection, confines the links against relative lateral movement in the directions of the pins 23, while the reception of the ends of the projections within recesses 28 prevents appreciable lateral movement apart of the interlocking members, in directions transversely of the pins. The interfitting relation of the links also may be such that the inner faces 29 of the links may be brought together into engagement. Thus from the foregoing it will be seen that though normally flexible, the members 11 and 12 when advanced in interlocked condition, are transformed into, in effect, a single rigid and unitary member capable of transmitting forces of great magnitude.

The invention contemplates the use of various mechanism in different relationships with the members 10 and 11 for advancing and retracting them into and out of interlocked condition. In Fig. 1 the actuating means is shown to comprise a shaft 30 having an enlargement 31 supported on thrust bearing 32 engaging the transverse support 33 in the base. The upper extent of the shaft carries screw threads 34 meshing with corresponding screw segments 35 on the insides of the links 12. On its lower end the shaft 30 carries a gear 36 rotatable in reverse direction by a worm 37 carried on shaft 38 suitably mounted in and extending transversely within the base 15. As will be understood without necessity for further illustration, shaft 38 and the worm 37 may be turned by a handle applied to an end of the shaft extending outside the base.

Through the described operating connections, shaft 31 may be rotated in one direction to advance upwardly the links 12 engaged by the threaded portion 34 of the shaft. Progressively upon elevation of the links, the guide 20 and 20a brings the lower convergent links together, see the lower links in Fig. 3, causing them to swing inwardly into parallel relation and interlocked engagement. Upon reverse rotation of the shaft 30, the links are retracted down into the base and divergently displaced therein, the shaft flare at 31 serving to direct and guide the links outwardly as they progressively move down against the flare.

The form of the invention shown in Fig. 6 is generally similar to the described embodiment with respect to the base structure 40 and the exterior interfitting configuration of the links 41, the principal difference being that the actuating means, generally indicated at 42 is applied to the outsides of the links and the latter preferably are given inside stationary supports. Here they are engageable with and supported against a stationary polygonal (typically square) vertical spindle 43, the inner faces 44 of the links being right angular for engagement against opposite corners of the spindle to prevent rotation of the links. Vertical displacement of the interlocked links is effected by a nut 45 engaging external thread segments 46 on the links, the nut riding on thrust bearing 47 and carrying a retaining ring 48 underlying the flanged top 49 of the guide 50. The nut contains circularly spaced openings 51 for reception of a handle bar by which the nut may be rotated in either direction to raise or lower the interlocked link assembly.

Figs. 7, 8 and 9 show another form of interlocking chain combination differing from the preceding forms in that while successive links in the same chain are identical, the companion links of the other chain are of different form, and particularly in a respect such that the interlock between the chains occurs by reason of the differences in the link form and shapes. Here the member or chain 52 comprises identical links 53 each having a pair of side lugs 54 received within corner recesses 55 of the adjacent link and connected thereto by pins 56. As seen in the view, the top portions of the links 53 carry transverse projections 57 (see Fig. 8) containing downwardly tapered center openings 58. The lower ends of links 53 carry depending projections 59 each corresponding substantially to one-half of a tapered pin sized to fit the opening 58 in the link below. Directly below the projection 57, the link 53 may be undercut as at 60.

Member or chain 61 consists of similarly interconnected links 62 each having in its top portion a notch or recess 63 to receive the projection 57 of the link 53 directly opposite. On the lower ends, links 62 carry depending projections 64 corresponding to the described projections 59 on links 53.

Referring to Fig. 7, as the links 53 and 62 are brought together, projections 59 and 64 form segments of a locking pin. As the bottom links 53 and 62 appearing in the view are brought together, projection 57 enters the recess 63 and opening 58 is swung upwardly to receive the pin segments 59 and 64, as illustrated in the positions above. As will be apparent, confinement of segments 59 and 64 within the openings 58 holds the links 52 and 62 against relative transverse movement in any direction, and integrates the chains into what becomes in effect a single substantially rigid member.

The form of the invention shown in Figs. 10 to 12 employs links 66 pivotally interconnected and having interlocked projections and recesses in the same manner and arrangement as the described form of Figs. 1 to 5. As shown in Fig. 12, the inner faces of the links are adapted to interengage at 67 and if desired may be recessed at 68 simply to reduce the weight of the links and chain assemblies. The chains in this instance are adapted to be advanced and retracted longitudinally by one or a pair of sprockets 69 applied to the outsides of the interlocked portions of the chains. As will be understood, the lower free ends of the chains may if desired be confined within a suitable stationary guide. Referring to Fig. 11 the side faces of the links 66 are recessed at 70 to accommodate rollers 71 on pins 72 interconnecting the links. Midway between successive pins 72, the links contain pins 73 carrying rollers 74 within the recess 70. Sprockets 69 engage the rollers 71 and 74, and upon rotation in opposite directions, as may be effected by any suitable means, operate to advance or retract the interlocked extends of the segments.

The final variational form of the invention shown in Figs. 13 to 16 employs fluid pressure actuated means for advancing and permitting retraction of the interlocking segmental members. The base 75 may be made essentially in conformance with the previously described embodiment of Fig. 1, and the interlocking members 76 and 77 may be made up of segments 78 having the same pivotal connections and interlocking projections which I have described with reference to Fig. 3. The interior configurations of the segments however are modified to accommodate and permit operation of the segmental members by the piston 79 of the hydraulic jack unit 80. Except for the top configuration of the piston and its capacity for rotation, as later described, the unit 80 may be of a conventional and known type, comprising a combination cylinder and accumulator housing 81 and a pump 82 operated by the lever 83. This known type of hydraulic jack mechanism is operable to elevate the piston 79 throughout a predetermined stroke, and to release fluid from the cylinder to permit lowering of the piston.

Each segment 78 has a substantially semi-circular bore 84, and above the bore a shoulder 85 below and offset outwardly from an opening 86. The individual bores of interlocked segments thus have their semi-circular bores 84 in registration below the registering openings 86 extending transversely a distance corresponding to the diameter of the openings 84. The piston 79 has a head 87 corresponding in shape to the registering openings 86 so as to be capable of passing therethrough, and also capable when rotated 90° with respect to the opening, of engaging upwardly against the shoulders 85 as in the position shown in Fig. 14. Referring to Fig. 15, the piston 79 may carry a handle 88 by which the piston is rotatable between the position of Fig. 14, and a position in which the head 87 registers with the openings 86. The upper guide end 89 of the base structure 75 rotatably supports a pair of pins 90 to which are integrally attached a pair of latch elements or dogs 91 engageable through openings 92 in the guide 89 within notches 93 in the outer faces of the segments 78. The positions of the dogs 91 are controllable by a throw arm 94 pivoted by pins 95 to the stationary lug 96 and connected by springs 97 to the pins or shafts 90. When thrown down to the solid line position of Fig. 16, the lever 94 deflects the springs 97 to rock pins 90 and the dogs 91 inwardly to the positions shown. When the lever is thrown upwardly to the dotted line position 94a, the pins and dogs are thrown outwardly to withdraw the inner ends of the dogs from the segment notches 93.

In considering the operation, assume the piston head 87 to be engaged against one pair of shoulders 85 as shown in Fig. 13. By elevation of the piston a distance corresponding at least to the distance between successive segments, the dogs are displaced out the initially occupied notches 93 and snapped back into the next pair of notches to prevent downward movement of the interlocked members when the lifting force of the piston is relieved. As will be apparent, by successive reciprocal operations of the piston, the interlocked members 76 and 77 may be projected and elevated whatever distance desired. From the foregoing it will be understood that engagement of the piston head 87 with the shoulders 85 of successive link pairs, is permitted by rotating the piston after each upward stroke to permit the head 87 to pass down through the openings 86 in the link pair below the head, whereupon the piston is then reversely rotated to bring the head 87 to the position of Fig. 14 and in engagement with shoulders 85 on the link pair below.

To lower the jack, and assuming the load to be supported by the piston 79, lever 94 is thrown upwardly to retract the dogs 91, whereupon downward movement of the piston is started. By again throwing the dogs inwardly, the dogs enter notches 93 next above when they are lowered to the dog position, thus relieving the load from the piston and permitting the latter to be rotated and elevated into engagement with the next pair of links to be supported through a similar lowering interval.

I claim:

1. Mechanism of the character described, comprising a pair of flexible segmental members, drive mechanism received between and engaging the members to advance them convergently together, and means on said members interengageable by movement together of the members to interlock and maintain the members against relative separation and in substantially rigid condition.

2. An automobile jack comprising work-moving means, a pair of members connected to said work-moving means and having forward interengaged substantially rigid portions and rearward flexible portions, a screw threaded element between and engageable with said members and operable to apply thereto a force acting to advance said work-moving means through said rigid portions of the members, and means for interlocking and thereby converting said flexible portions of the members into rigid condition when advanced by said element.

3. Mechanism of the character described, comprising a pair of flexible members each comprising a series of successive substantially identical rigid segments directly pivotally interconnected, the successive segments of each member being in alignment longitudinally of the member, and means for bringing said members into side-by-side relation, said segments having portions formed integrally therewith and progressively interengageable by movement of the members together to interlock and maintain the members against separation and in substantially rigid condition.

4. Mechanism of the character described, comprising guide means, a pair of flexible members each including a series of directly pivotally interconnected substantially identical segments engageable in end-to-end relation, the successive segments of each member being in alignment longitudinally of the member, and means for advancing said members through said guide means and thereby bringing the members and segments together in side-by-side relation, said segments having integral projections and containing recesses interengageable by movement of the members together to interlock and maintain the members against separation and in substantially rigid condition.

5. Mechanism of the character described, comprising a pair of flexible segmental members, screw threaded means engaging and operating to advance said members convergently together, and means on said members interengageable by movement together of the members to interlock the members against separation and maintain them in substantially rigid condition.

6. Mechanism of the character described, comprising a pair of flexible segmental members, screw threaded means engaging between and operating to advance said members convergently together, and means on said members interengageable by movement together of the members to interlock the members against separation and maintain them in substantially rigid condition.

7. Mechanism of the character described comprising a pair of elongated flexible members each comprising a series of directly pivotally interconnected successive rigid segments, means for longitudinally advancing said members convergently together and then advancing them as a unit in side-by-side relation, and means on said segments of both members progressively interengageable as the members come together and acting to interlock the members against separation from each other and maintain them in substantially rigid condition, as they advance in said side-by-side relation, the individual segments of each member having central end faces at their opposite ends receivable in abutting engagement in said rigid condition of the members to transmit compressive force longitudinally of the members independently of the pivotal connections between said segments, and each of the individual segments having a lateral face engaging the opposite member in abutting relation at locations adjacent each of said opposite ends of that segment.

8. Mechanism of the character described comprising a pair of elongated flexible members each comprising a series of directly pivotally interconnected successive rigid segments, means for longitudinally advancing said members convergently together and then advancing them as a unit in side-by-side relation, and means on said segments of both members progressively interengageable as the members come together and acting to interlock the members against separation from each other and maintain them in substantially rigid condition, as they advance in said side-by-side relation, the individual segments of each member having central end faces at their opposite ends receivable in abutting engagement in said rigid condition of the members to transmit compressive force longitudinally of the members independently of the pivotal connections between said segments, and each of the individual segments having a lateral face engaging the opposite member substantially continuously between the locations of said end surfaces of that segment.

9. Mechanism of the character described comprising a pair of elongated flexible members each comprising a series of directly pivotally interconnected successive rigid segments, said members being longitudinally advanceable convergently together and then advanceable as a unit in side-by-side relation, means on said segments of both members progressively interengageable as the members come together and acting to interlock the members against separation from each other and maintain them in substantially rigid condition, as they advance in side-by-side relation, and an elongated element extending longitudinally between said members near their point at which they cease to converge, the individual segments of each member having central end faces at their opposite ends receivable in abutting engagement in said rigid condition of the members to transmit force longitudinally of the members independently of the pivotal connection between said segments, opposed segments of said members having lateral surfaces receivable in abutting engagement in said rigid condition of the members and engaging at both sides of said element.

10. Mechanism of the character described comprising a pair of elongated flexible members longitudinally advanceable convergently together and then advanceable as a unit in side-by-side relation, each of said members comprising a series of directly pivotally interconnected successive rigid segments, a rotatable screw element extending longitudinally between said members at the point at which they cease to converge and threadedly engaging said segments for effecting the advancement and retraction of the members, means on said segments of both members progressively interengageable as the members come together and acting to interlock the members against separation from each other and maintain them in substantially rigid condition as they advance in said side-by-side relation, the individual segments of each member having central end faces at their opposite ends receivable in abutting engagement in said rigid condition of the members to transmit force longitudinally of the members independently of the pivotal connection between said segments, opposed segments of said members having lateral surfaces receivable in abutting engagement in said rigid condition of the members and engaging at both sides of said screw element substantially continuously between said end faces of each of said opposed segments.

11. Mechanism of the character described comprising a pair of elongated flexible members each comprising a series of directly pivotally interconnected successive rigid segments, means for longitudinally advancing said members convergently together and then advancing them as a unit in side-by-side relation, and means on said segments of both members progressively interengageable as the members come together and acting to interlock the members against separation from each other and maintain them in substantially rigid condition, as they advance in said side-by-side relation, said segments being so constructed that the members in said side-by-side relation form together a bar-like unit substantially square in cross section.

12. Mechanism of the character described comprising a pair of elongated flexible members each comprising a series of directly pivotally interconnected successive rigid segments, means for longitudinally advancing said members convergently together and then advancing them as a unit in side-by-side relation, and means on said segments of both members progressively interengageable as the members come together and acting to interlock the members against separation from each other and maintain them in substantially rigid condition, said last mentioned means including a pair of projections on each of said segments extending toward the opposed member for interengagement therewith and extending angularly in opposite directions longitudinally of the members.

13. Mechanism of the character described comprising a pair of elongated flexible members each comprising a series of directly pivotally interconnected successive rigid and substantially identical segments, means for longitudinally advancing said members convergently together and then advancing them as a unit in side-by-side relation, means on said segments of both members progressively interengageable as the members come together and acting to interlock the members against separation from each other and maintain them in substantially rigid condition as they advance in said side-by-side relation, said last mentioned means including a pair of integral projections extending from the opposite sides of each of said segments toward the opposed member and receivable within recesses in the outer surfaces of said opposed member, the two projections of each segment being offset longitudinally of the member and extending angularly in opposite directions longitudinally of the members.

14. Mechanism of the character described comprising a pair of elongated flexible members longitudinally advanceable convergently together and then advanceable as a unit in side-by-side relation, each of said members comprising a series of directly pivotally interconnected successive rigid segments, an internally threaded ring received about said members near the point at which they cease to converge and threadedly engaging said segments for effecting the advancement and retraction of the members, the individual segments of each member having central end faces at their opposite ends receivable in abutting engagement in said rigid condition of the members to transmit compressive force longitudinally of the members independently of the pivotal connections between said segments, and each of the individual segments of each member having a lateral face engaging the other member in abutting engagement substantially continuously between said end surfaces of that segment.

15. Mechanism of the character described comprising a hollow housing having a tubular portion projecting outwardly therefrom, a pair of elongated flexible members partially received in said housing at opposite sides of said tubular portion thereof and each comprising a series of directly pivotally interconnected successive rigid segments, means for longitudinally advancing said members convergently together and then outwardly through said tubular portion of the housing in side-by-side relation, a work engaging member carried by and interconnecting the outer ends of said members, means on said segments of both members progressively interengageable as the members come together and acting to interlock the members against separation from each other and maintain them in substantially rigid condition as they advance in said side-by-side relation, the individual segments of each member having central end faces at their opposite ends receivable in abutting engagement in said rigid condition of the members to transmit compressive force longitudinally of the members independently of the pivotal connections between said segments, and each of the individual segments of each member having a lateral face engaging the other member in abutting engagement substantially continuously between said end surfaces of that segment.

16. Mechanism of the character described comprising a hollow housing having a tubular portion projecting outwardly therefrom, a pair of elongated flexible members partially received in said housing at opposite sides of said tubular portion thereof and adapted for longitudinal advancement convergently together and then outwardly through said tubular portion of the housing in side-by-side relation, each of said members comprising a series of substantially identical directly pivotally interconnected successive rigid segments, a work engaging member carried by and interconnecting the outer ends of said members at the outside of the housing, a rotatable screw element extending axially within said tubular portion of the housing between said members and threadedly engaging said segments for effecting the longitudinal advancement and retraction of the members, means on said segments of both members progressively interengageable as the members come together and acting to interlock the members against separation from each other and maintain them in substantially rigid condition as they advance in said side-by-side relation, the individual segments of each member having central end faces at their opposite ends receivable in abutting engagement in said rigid condition of the members to transmit force longitudinally of the members independently of the pivotal connection between said segments, opposed segments of said members having lateral surfaces receivable in abutting engagement in said rigid condition of the members and engaging at both sides of said screw element substantially continuously between said end faces of each of said opposed segments.

17. Mechanism of the character described comprising a hollow housing having a tubular portion projecting outwardly therefrom, a pair of elongated flexible members partially received in said housing at opposite sides of said tubular portion thereof and adapted for longitudinal advancement convergently together and then outwardly through said tubular portion of the housing in side-by-side relation, each of said members comprising a series of substantially identical directly pivotally interconnected successive rigid segments, a work engaging member carried by and interconnecting the outer ends of said members at the outside of the housing, a rotatable screw element extending axially within said tubular portion of the housing between said members and threadedly engaging said segments for effecting the longitudinal advancement and retraction of the members, a worm gear within said housing carried by and rotatable with said screw element, a worm operable to drive said worm gear and operatively connected to a manual actuating element at the outside of the housing, means on said segments of both members progressively interengageable as the members come together and acting to interlock the members against separation from each other and maintain them in substantially rigid condition as they advance in said side-by-side relation, said last mentioned means including a pair of integral projections extending from the opposite sides of each of said segments toward the opposed member and receivable within recesses in the outer surfaces of segments of said opposed member, the two projections of each segment being offset longitudinally of the member and extending angularly in opposite directions longitudinally of the members, said segments being so constructed that the members in said side by side relation form together a bar like unit substantially square in cross section and having substantially continuous outer surfaces on all sides, the individual segments of each member having central end faces at their opposite ends receivable in abutting engagement in said rigid condition of the members to transmit force longitudinally of the members independently of the pivotal connection between said segments, opposed segments of said members having lateral surfaces receivable in abutting engagement in said rigid condition of the members and engaging at both sides of said screw element substantially continuously between said end faces of each of said opposed segments.

18. Mechanism of the character described comprising a pair of elongated flexible members longitudinally advanceable convergently together and then advanceable as a unit in side by side relation, each of said members comprising a series of directly pivotally interconnected successive rigid segments, a reciprocable actuating element adapted to successively engage and advance the segments of one of said members to thereby progressively advance said members, releasable detent means for retaining said members in the positions to which they are successively advanced by said actuating element, and means on said segments of both members progressively interengageable as the members come together and acting to interlock the members against separation from each other and maintain them in substantially rigid condition as they advance in said side-by-side relation, the individual segments of each member having central end faces at their opposite ends receivable in abutting engagement in said rigid condition of the members to transmit compressive force longitudinally of the members independently of the pivotal connections between said segments, and each of the individual segments having a lateral face engaging the opposite member in abutting relation at locations adjacent each of said opposite ends of that segment.

19. Mechanism of the character described comprising a hollow housing having a tubular portion projecting outwardly therefrom, a pair of elongated flexible members partially received in said housing at opposite sides of said tubular portion thereof and adapted for longitudinal advancement convergently together and then outwardly through said tubular portion of the housing in side-by-side relation, each of said members comprising a series of substantially identical directly pivotally interconnected successive rigid segments, a work engaging member carried by and interconnecting the outer ends of said members at the outside of the housing, a hydraulic power unit within said housing and including a reciprocable piston projecting to a position within said tubular portion of the housing and between the members and adapted to successively engage and advance the segments of said members to thereby progressively advance said members, releasable detent means carried by said tubular portion of the housing for engaging and retaining the members in the positions to which they are successively advanced by said piston, means on said segments of both members progressively interengageable as the members come together and acting to interlock the members against separation from each other and maintain them in substantially rigid condition as they advance in said side-by-side relation, the individual segments of each member having central end faces at their opposite ends receivable in abutting engagement in said rigid condition of the members to transmit compressive force longitudinally of the members independently of the pivotal connections between said segments, and each of the individual segments having a lateral face engaging the opposite member in abutting relation at locations adjacent each of said opposite ends of that segment.

20. Mechanism of the character described comprising a pair of elongated flexible members each comprising a series of directly pivotally interconnected successive rigid segments, fluid pressure actuated means for longitudinally advancing said members convergently together and then advancing them as a unit in side-by-side relation, and means on said segments of both members progressively interengageable as the members come together and acting to interlock the members against separation from each other and maintain them in substantially rigid condition, as they advance in said side-by-side relation, the individual segments of each member having central end faces at their opposite ends receivable in abutting engagement in said rigid condition of the members to transmit compressive force longitudinally of the members independently of the pivotal connections between said segments, and each of the individual segments having a lateral face engaging the opposite member in abutting relation at locations adjacent each of said opposite ends of that segment.

HAROLD C. PIERCE.

(References on following page)

REFERENCES CITED

The following references are of record in the file of this patent:

UNITED STATES PATENTS

| Number | Name | Date |
|---|---|---|
| 181,077 | Kurtz | Aug. 15, 1876 |
| 522,252 | Garrison | July 3, 1894 |
| 1,136,934 | Camp | Apr. 27, 1915 |
| 1,418,505 | Wolf | June 6, 1922 |
| 1,570,014 | Stevens | Jan. 19, 1926 |
| 1,577,040 | Larson | Mar. 16, 1926 |
| 1,624,106 | Larson | Apr. 12, 1927 |
| 1,834,900 | Holmes | Dec. 1, 1931 |
| 2,017,300 | Weisman | Oct. 15, 1935 |
| 2,131,261 | Aldeen et al. | Sept. 27, 1938 |
| 2,375,461 | Bender | May 8, 1945 |
| 2,375,462 | Bender | May 8, 1945 |

FOREIGN PATENTS

| Number | Country | Date |
|---|---|---|
| 418,690 | Great Britain | Oct. 30, 1934 |
| 778,375 | France | June 12, 1934 |